Patented Nov. 2, 1926.

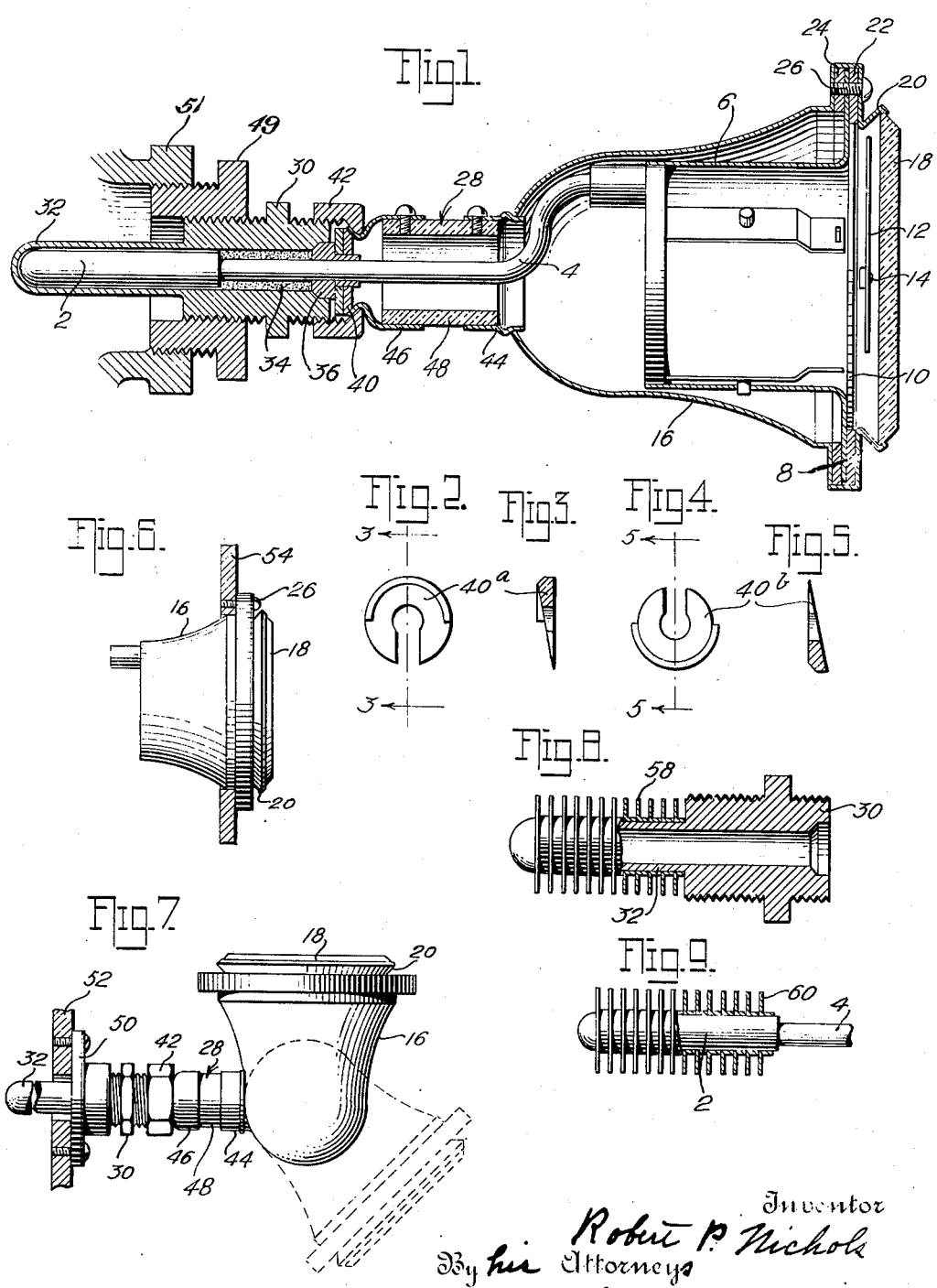

1,605,057

UNITED STATES PATENT OFFICE.

ROBERT P. NICHOLS, OF NEW ROCHELLE, NEW YORK.

TEMPERATURE INDICATOR.

Application filed September 10, 1921. Serial No. 499,701.

This invention relates to a measuring instrument for registering or indicating temperatures and the like, and more particularly to such instruments of the type which comprises a dial and an indicating or registering device associated with the dial.

The principal objects of the invention are to improve the construction and mode of operation of instruments of this general type and to produce an instrument of this character which is strong and durable in construction, which may be cheaply manufactured, and which may be readily mounted so that it may be easily read at a distance.

With these objects in view certain features of the present invention relate to improvements in the construction for mounting the instrument in operating position. The instrument in its preferred form comprises a casing having a neck and a tubular fitting for supporting the instrument on the mechanism to be tested, and certain features of the invention relate particularly to an improved and simplified construction for connecting the neck of the casing with the fitting.

In the present form of the invention the instrument comprises a device adapted to be located at the point or within the mechanism to be tested and connecting means passing through the fitting for connecting said device with an indicator actuating mechanism within the casing, and certain features of the invention relate to a novel and improved construction for sealing the fitting.

Certain other features of the invention relate to a novel and improved construction for trimming the dial and holding the lens or crystal covering the dial in place.

Other features of the invention consist of certain novel and improved constructions, arrangements and combination of parts hereinafter described and particularly pointed out in the claims, the advantages of which will be readily understood and appreciated by those skilled in the art.

The invention will be clearly understood from the accompanying drawings illustrating an instrument embodying the invention in its preferred form and the following detailed description of the constructions therein shown.

In the drawings—

Figure 1 is a view in axial section of an instrument embodying the invention;

Fig. 2 is a detail view in elevation illustrating one of the parts of a two-part disc or washer constituting one of the elements of the instrument;

Fig. 3 is a sectional view taken substantially on the line 3—3 of Fig. 2;

Fig. 4 is a detail view in elevation of the co-operating part of said disc or washer;

Fig. 5 is a sectional view taken substantially on the line 5—5 of Fig. 4;

Fig. 6 is a view in side elevation partly in section illustrating the manner in which the instrument may be supported on an instrument board;

Fig. 7 is a view in side elevation illustrating the manner in which the indicator may be constructed to face in different directions;

Fig. 8 is a detail view partly in side elevation and partly in section illustrating certain additions to the construction shown in Fig. 1; and Fig. 9 is a view partly in side elevation and partly in section illustrating a slight modification of the construction shown in Fig. 1.

In the form of the invention illustrated in the drawings the instrument comprises a bulb 2 adapted to be placed within the apparatus or at a point the temperature of which is to be taken, and a capillary tube 4 connecting the bulb with an indicator actuating mechanism. This indicator actuating mechanism, which is of well known construction and need not be described herein, snaps into a shell 6 preferably made of sheet metal. The shell 6 is provided at its forward end with an outwardly extending flange indicated at 8, and a disc shaped dial 10 is applied to the outer face of this flange, as clearly shown in Fig. 1. An indicator 12, consisting of a pointer, is pivoted at 14 to swing across the outer face of the dial, the dial being provided with a suitable temperature scale. This indicator is connected to the indicator actuating mechanism within the shell 6.

The shell 6 is surrounded by a casing 16 to protect effectively the parts from weather, steam and dust and thus prolong the life of the instrument. The space in front of the dial is enclosed by a crystal 18. The crystal is held in place by means of a ring 20, preferably made of sheet metal, bent to the desired shape. This ring, as clearly shown in Fig. 1, is spun around the edge of the crystal and is bevelled inwardly between the crystal and the dial so as to engage the outer face of the marginal portion of the dial, and is provided with a portion extending outwardly from the margin of the dial in a plane substantially parallel with the plane of the dial. The ring thus holds the dial in place and trims the dial or covers the margin thereof, which usually has a raw edge resulting from the manner in which it is manufactured.

In order to make a weather-proof joint between the ring 20 and the shell 6, a gasket 22 is preferably interposed between the flange 8 on the shell and the ring 20. A similar gasket 24 is interposed between the flange 8 on the shell and an outwardly extending flange on the casing 16 to make a close-fitting, weather-proof joint between the shell and the casing. The ring 20 may be bent so as to cover the outer edges of the flanges on the shell and casing and the gaskets 22 and 24 as shown. The ring, shell and casing may be securely attached together by means of a series of screws 26, as shown in Fig. 1. As shown in Fig. 1, the casing is provided with a neck, indicated at 28, and the instrument comprises a tubular fitting 30 attached to the neck of the casing by which fitting the instrument may be mounted on the mechanism to be tested. In the form of the invention shown in Fig. 1 the fitting 30 is provided at its inner end with a well 32 to receive the bulb 2, and the space about the bulb and capillary tube 4 within the well and fitting is filled with a good heat-conducting fluid or solid 34 such as graphite, grease, or oil. The neck of the casing is secured to the fitting so that the casing and body of the instrument may be rotatably adjusted, and the outer end of the fitting is sealed by means of a single tubular connecting member. To this end a washer 36 is mounted on the capillary tube 4 at the outer end of the fitting 30 and is provided with a bevelled surface arranged to engage a correspondingly bevelled seat on the fitting. Upon a tubular extension on the washer 36 is mounted a two-part disk or washer, indicated as a whole at 40 in Fig. 1, which is provided with a bevelled surface arranged to engage an outwardly extending flange on the neck 28 of the casing. The connecting member referred to above consists, in the construction shown, of a nut 42 threaded to receive the correspondingly threaded end of the fitting 30 and provided with an inwardly extending flange arranged to engage the outwardly extending flange on the neck of the casing, the nut thus being rotatably mounted on the neck of the casing. When the nut 42 is tightened, the neck of the casing is securely clamped between the flange and the nut, and the washer 36 is forced against its seat on the fitting 30 thereby sealing tightly the fitting. Upon loosening the nut 42 the casing may be rotatably adjusted in any desired position.

The neck of the casing comprises two neck spinnings or sleeves 44 and 46, preferably made of sheet metal, and a heat insulating bushing 48 fitted tightly within said neck spinnings and preferably secured thereto by suitable screws. This heat insulating bushing may be made of bakelite or any other material suitable for the purpose. The neck spinning 44 is inserted in an opening in the inner part of the body of the casing, which is preferably hemispherical in form as shown, and the neck spinning is soldered or secured in any suitable manner to the body of the casing. By suitably locating the opening in the hemispherical part of the casing for the reception of the neck spinning, the instrument may be readily constructed to face at any desired angle. Fig. 1 shows the instrument facing in the direction of the axis of the neck of the casing, while Fig. 7 shows in full lines the instrument facing in a direction at right angles to the axis of the neck, and in dotted lines the instrument facing in an inclined direction with relation to said axis.

To enable the washer 40 to be readily inserted in operating position, the washer may be constructed in two parts, as shown in Figs. 2, 3, 4 and 5. As illustrated in these figures, the washer comprises two parts shown respectively at 40$^a$ and 40$^b$ provided with oppositely inclined faces adapted to engage each other when the parts are assembled. Each of the parts of the washer is provided with a central circular opening and with a slot leading thereto. This enables the washer readily to be applied over the capillary tube 4.

As shown in Fig. 1, the fitting 30 is threaded into an adapter 49 which in turn is threaded into a tubular boss indicated at 51 on the mechanism to be tested. As shown in Fig. 7, an adapter 50 is provided with a flange secured to a plate 52 by means of suitable screws, the well on the fitting 30 passing through an opening in the plate.

As shown in Fig. 6, the body of the instrument is mounted in an opening in an instrument board 54 and is secured to the instrument board by means of screws passing through the ring 20 and through the flanges on the shell and casing. When it is desired to make the well of the fitting 30 highly sensitive, a series of fins 58 made of suitably bent rings of sheet metal may be forced on the exterior of the well, as shown in Fig. 8. When a bulb is used without the surrounding well, the bulb may be made highly sensitive in a corresponding manner by forcing a series of fins 60 on the exterior of the bulb.

The term "indicator" employed in the claims is not to be construed in a restricted sense, but this term is intended to define generally any element for indicating or registering the condition to be tested.

When it is not necessary or desirable to employ a fitting having a well portion, the well may be omitted from the fitting construction. In this case the heat conducting fluid 34 is also omitted, the gas vapor or fluid within the mechanism or at the point to be tested contacting directly with the bulb 2. When a fitting without a well is employed, the engagement of the disk 36 with its seat on the fitting effectively prevents the gas or fluid within the mechanism which is being tested from being forced through the outer end of the fitting and the passage of such vapor or gas into the body of the instrument is also prevented by the engagement of a disk 40 with the outwardly extending flange on the neck of the casing.

Although the present invention has been illustrated and described as embodied in an instrument for indicating temperatures, the invention is not limited to an instrument for this particular purpose, but certain features thereof may be embodied in measuring instruments for various other purposes. It is to be understood therefore, that except as defined in the claims, the invention is not limited to any particular class or type of measuring instrument. It will also be understood that the invention is not limited to the particular construction and arrangement of parts of the illustrated embodiment of the invention, but that the invention may be embodied in other forms within the scope of the claims.

Having explained the nature and object of the invention and having specifically described a device embodying the invention in its preferred form, what is claimed is:

1. A measuring instrument of the character described, comprising in combination an instrument body, a dial thereon, an indicator operating over the dial, an indicator operating mechanism, a crystal covering the dial, and a detachable sheet metal ring bent so as to cover the margin of the dial between the dial and the crystal and also to hold the crystal in place.

2. A measuring instrument of the character described, comprising a shell having an outwardly extending flange, a dial bearing on said flange, an indicator operating on said dial, indicator actuating mechanism mounted in the shell, a crystal and a sheet metal ring bent to cover the margin of the dial between the crystal and the dial and to hold the crystal in place and also extending outwardly in a direction substantially parallel with said flange, and means for securing the ring to said flange.

3. A measuring instrument of the character described having, in combination, a shell having an outwardly extending flange, a dial bearing on said flange, an indicator operating on the dial, indicator actuating mechanism mounted in the shell, a crystal, a sheet metal ring bent to cover the margin of the dial between the crystal and the dial and to hold the crystal in place and also extending outwardly in a direction substantially parallel with the plane of said flange, a gasket interposed between the ring and said flange and surrounding the dial in the plane thereof, and means for securing the ring to said flange.

4. A measuring instrument of the character described, comprising in combination an instrument body, a dial thereon, an indicator operating over the dial, an indicator operating mechanism, a crystal covering the dial, a continuous flange surrounding the instrument body and supporting the outer margin of the dial, and a detachable sheet metal ring bent so as to cover the margin of the dial between the dial and the crystal and to hold the crystal in place, said ring being attached to the instrument body flange.

5. A measuring instrument of the character described having, in combination, a shell having an outwardly extending flange, a dial bearing on said flange, an indicator operating on the dial, indicator actuating mechanism mounted in the shell, a crystal, a sheet metal ring bent to cover the margin of the dial between the crystal and the dial and to hold the crystal in place and also extending outwardly in a direction substantially parallel with said flange, a gasket interposed between said ring and said flange and surrounding the dial, a casing surrounding the shell and having a flange substantially parallel with the flange on the shell, a gasket interposed between the two last mentioned flanges, and means for securing the ring and said flanges together.

6. A measuring instrument of the character described having, in combination, a shell having an outwardly extending flange, a dial bearing on said flange, an indicator operating on the dial, indicator actuating mechanism mounted in the shell, a crystal, a sheet metal ring adapted to cover the margin of the dial between the crystal and the dial and to hold the crystal in place and also extending outwardly in a direction substantially parallel with said flange, a casing surrounding the shell and having a flange substantially parallel with the flange on the shell, and means for securing the ring and the flanges on the casing and shell together.

7. A measuring instrument of the character described having, in combination, a casing, a scale plate mounted in said casing, an indicating pointer moving adjacent the scale plate, pointer actuating mechanism mounted in the casing, a device arranged to be located at the point to be tested, a connection between said device and the pointer actuating mechanism, and tubular supporting means enclosing said connections for supporting the casing and including a heat insulating bushing constituting substantially the only connection between the casing and the mechanism to be tested at one point.

8. A measuring instrument of the character described having, in combination, a casing, a scale plate mounted in said casing, the indicating pointer movable adjacent the scale plate, pointer actuating mechanism mounted in the casing, a bulb, tubing connecting the bulb with said mechanism, and tubular supporting means enclosing the bulb and said tubing for supporting the casing and including a heat insulating bushing.

9. A measuring instrument of the character described having, in combination, an instrument body, a dial mounted on said body, an indicator operating on the dial, an indicator actuating mechanism, and means for supporting the body of the instrument upon the device to be tested so that the instrument body may be adjusted angularly about an axis parallel to the plane of the dial.

10. A measuring instrument of the character described having, in combination, a casing having a neck, an indicator mounted in said casing, indicator actuating mechanism mounted in a casing, a tubular fitting, a bulb, tubing connecting the bulb with said mechanism and passing through the fitting, fluid surrounding the tubing within the fitting, one or more sealing disks surrounding the piping and interposed between said fitting and the neck of the casing, and a nut arranged to clamp the neck of the casing between one of said disks and the nut and to force one of said disks against the fitting to seal the same.

11. A measuring instrument of the character described having, in combination, a casing having a neck formed with an outturned flange, an indicator mounted in said casing, indicator actuating mechanism mounted in the casing, a tubular fitting adapted to support the instrument, a bulb, tubing connecting the bulb with said mechanism and passing through the fitting, a fluid surrounding the tubing within the fitting, one or more disks interposed between the fitting and the neck of the casing, and a nut threaded on the fitting and arranged to clamp the outturned flange on the neck of the casing against one of said disks and to force one of said disks against a seat on the fitting to seal the same.

12. A measuring instrument of the character described having, in combination, a casing having a neck, an indicator mounted in said casing, indicator actuating mechanism mounted in the casing, a tubular fitting having a well, a bulb mounted in the well, tubing connecting the bulb with said mechanism, a fluid surrounding the bulb and tubing within the fitting, one or more sealing disks surrounding the tubing and interposed between the fitting and the neck of the casing, and a nut arranged to clamp the neck of the casing against one of said disks and to force one of said disks against a seat on the fitting to seal the same.

13. A measuring instrument of the character described having, in combination, a casing having a substantially hemispherical portion, an indicator mounted in said casing, indicator actuating mechanism mounted in the casing and a tubular neck member for the casing engaging in a radial opening in the hemispherical portion of the casing.

Signed at New York city, N. Y., this 9th day of September, 1921.

ROBERT P. NICHOLS.